F. SCHAR.
METHOD OF MAKING CHAINS.
APPLICATION FILED SEPT. 11, 1908.

925,656.

Patented June 22, 1909.
2 SHEETS—SHEET 1.

Witnesses:
C. H. Crawford
E. Schallinger

Inventor:-
Ferdinand Schar
by B. Singer
Attorney

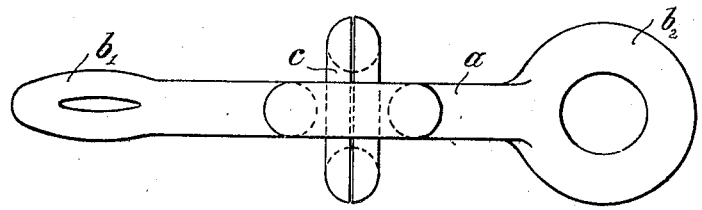
Fig. 6
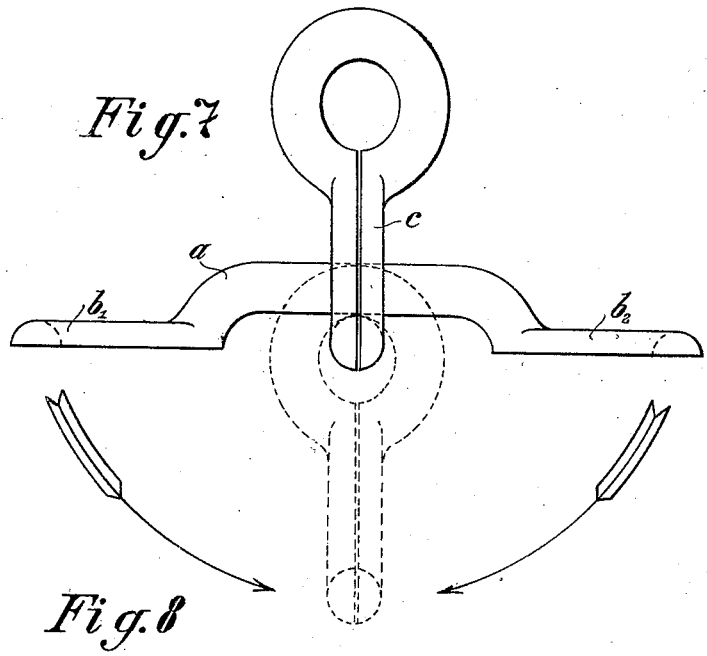
Fig. 7
Fig. 8
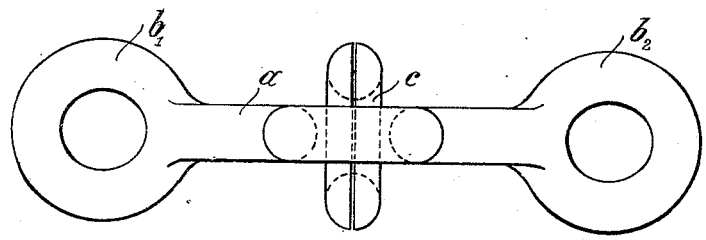

UNITED STATES PATENT OFFICE.

FERDINAND SCHAR, OF SCHWECHAT, NEAR VIENNA, AUSTRIA-HUNGARY.

METHOD OF MAKING CHAINS.

No. 925,656.  Specification of Letters Patent.  Patented June 22, 1909.

Application filed September 11, 1908.  Serial No. 452,591.

*To all whom it may concern:*

Be it known that I, FERDINAND SCHAR, a subject of the Emperor of Austria-Hungary, and resident of Schwechat, near Vienna, Austria-Hungary, have invented certain new and useful Methods of Manufacturing Chains, of which the following is a specification.

This invention relates to a method of manufacturing chains of that kind in which the single links are made of a single non-welded piece of material and are provided with two eyes arranged at a right angle to each other, the width of one of the eyes being reduced before threading it through the previous link and afterward enlarged. According to this invention this reduction of the width of an eye of each link is caused by bending its longitudinal arc portions about the longitudinal axis of the piece of material by which method the manufacture of such chains is considerably simpler than the methods already known.

In the accompanying drawings the various stages of the manufacture of a link by the method forming the subject of this invention are illustrated in Figures 1 to 8.

Figure 1:
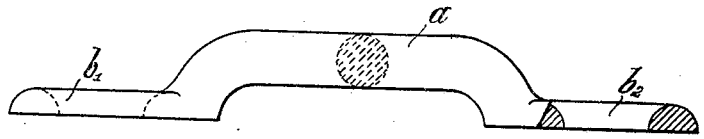
Figure 2:
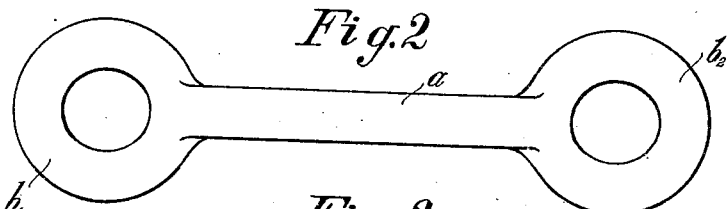
Figure 3:
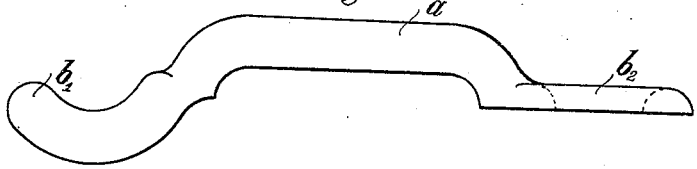
Figure 4:
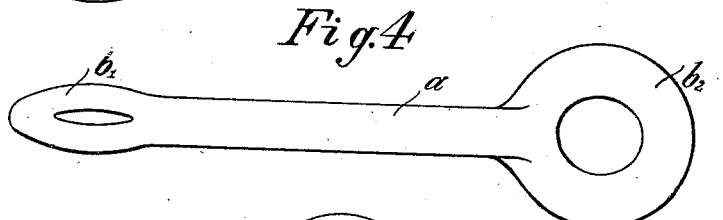
Figure 5:
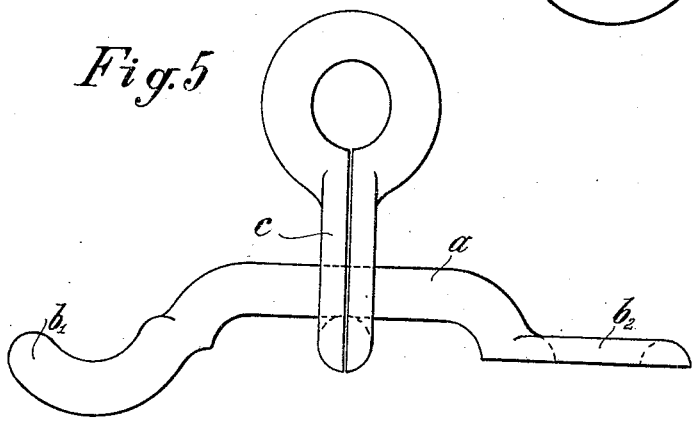

For manufacturing a chain by the said method a piece of material such as shown in Figs. 1 and 2 is used. This piece of material is obtained from a piece of round iron, the free ends of which are formed into annular eyes. The central part $a$ connecting the two eyes, is of circular cross-section, while the two eyes $b^1$ $b^2$ have semi-circular cross-section, so that when the piece of material is bent to U-shape, the said eyes can be brought into contact with each other, in which position the semi-circular cross-sections supplement each other to form a completely circular cross-section. By thus bending the piece of material, a chain link is obtained, the central part $a$ forming one eye, and the parts $b^1$, and $b^2$ arranged against each other, form the second eye. In order to enable such a piece of material provided at both ends with one eye, to be introduced into the already finished free eye of the previous chain link of the chain to be made, it is first necessary that one of the two eyes of the piece of material to be introduced should be closed for the purpose of reducing its width. This closing is effected, preferably, by rolling, in such manner that the two longitudinal arc portions of the eye $b^1$ are brought together by bending the eye about the longitudinal axis of the piece of material. In this way the piece of material receives the shape shown in Figs. 3 and 4 and can then, as shown in Figs. 5 and 6 be introduced through the free eye $c$ of the previous chain link. After this has been done the closed eye of the piece of material can be again brought back into its original shape as shown in Figs. 7 and 8, the chain link being then brought back into its final shape, which is effected by moving the two halves of the annular eye normally to their plane in the direction of the arrow shown in Fig. 7 toward each other, until their flat bottom surfaces come to rest on each other, whereupon they close to form an eye, while the second eye is formed by the central part bent to U-shape as shown dotted in Fig. 7.

Having now particularly described and ascertained the nature of the said invention and in what manner the same is to be performed, I declare that what I claim is:—

The herein described method of making weldless link chains from blanks each formed of a single strip of material and provided at each end with an eye, which consists first, in bending a blank to bring said eyes together to form one eye of the link and thereby forming the other eye by the said bend, in flattening one eye of each succeeding blank and inserting the flattened eye through the eye of the completed link, which was formed of the two ends of the blank in opening said flattened eye and bending the same to bring the eyes together, substantially as described.

In testimony whereof I affix my signature in presence of two witnesses.

FERDINAND SCHAR.

Witnesses:
 S. W. TREMMERY,
 ARTHUR HERZOG.